(12) United States Patent
Cotte et al.

(10) Patent No.: US 6,834,671 B2
(45) Date of Patent: Dec. 28, 2004

(54) CHECK VALVE FOR MICRO ELECTRO MECHANICAL STRUCTURE DEVICES

(75) Inventors: John Michael Cotte, New Fairfield, CT (US); Kenneth John McCullough, Fishkill, NY (US); Wayne Martin Moreau, Wappingers Falls, NY (US); John P. Simons, Wappingers Falls, NY (US); Charles J. Taft, Wappingers Falls, NY (US); Richard P. Volant, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/743,155

(22) Filed: Dec. 22, 2003

(65) Prior Publication Data

US 2004/0134538 A1 Jul. 15, 2004

Related U.S. Application Data

(62) Division of application No. 09/915,786, filed on Jul. 26, 2001, now abandoned.

(51) Int. Cl.[7] ............................................... F16K 15/02
(52) U.S. Cl. ..................... 137/528; 137/496; 137/513.7
(58) Field of Search ................................. 137/496, 511, 137/513.7, 528

(56) References Cited

U.S. PATENT DOCUMENTS

| | | | |
|---|---|---|---|
| 1,091,463 A | * | 3/1914 | Vincent ........................ 137/98 |
| 1,214,553 A | * | 2/1917 | Keppel ......................... 137/496 |
| 1,883,190 A | * | 10/1932 | Welcker ....................... 137/511 |
| 2,164,622 A | * | 7/1939 | Podolsky ..................... 137/217 |
| 3,628,565 A | | 12/1971 | McWethy et al. |
| 4,487,662 A | | 12/1984 | Fischbeck |
| 4,585,209 A | | 4/1986 | Aine et al. |
| 4,592,382 A | * | 6/1986 | Rubin et al. ................. 137/218 |
| 5,044,396 A | | 9/1991 | Daudet et al. |
| 5,161,571 A | * | 11/1992 | Nakazawa et al. ........... 137/496 |
| 5,413,142 A | | 5/1995 | Johnson et al. |
| 5,439,022 A | * | 8/1995 | Summers et al. ............ 137/102 |
| 5,881,881 A | | 3/1999 | Carrington |
| 5,899,218 A | | 5/1999 | Dugan |
| 6,024,801 A | | 2/2000 | Wallace et al. |
| 6,334,761 B1 | | 1/2002 | Tai et al. |
| 6,493,964 B1 | | 12/2002 | Tousimis et al. |

* cited by examiner

Primary Examiner—Ramesh Krishnamurthy
(74) Attorney, Agent, or Firm—Scully, Scott, Murphy & Presser; Daniel P. Morris

(57) ABSTRACT

A check valve for micro electro mechanical structure devices (MEMS), and in particular pertains to a check valve which is adapted to be employed in connection with micro electro mechanical structure devices which are intended to be employed with supercritical fluids constituting working fluids. In a preferred embodiment, the check valve is equipped with a bypass channel including a freely moveable plug structure which, in the open position of the valve enables the ingress of supercritical fluids under high super-atmospheric pressures, and subsequent to the filling of the system, let down to atmospheric pressure, causes the plug to be moved into a permanent valve-closed position.

6 Claims, 3 Drawing Sheets

CHECK VALVE FOR MICRO ELECTRO MECHANICAL STRUCTURE DEVICES

This application is a divisional of U.S. application Ser. No. 09/915,786, filed Jul. 26, 2001 now abandoned.

BACKGROUND OF THE INVENTION

1. Field of the Invention

The present invention relates to a check valve for micro electro mechanical structure devices (MEMS), and in particular pertains to a check valve which is adapted to be employed in connection with micro electro mechanical structure devices which are intended to be employed with the use of high-pressure fluids constituting working fluids.

2. Discussion of the Prior Art

The utilization of check valves in the most diverse designs and configurations thereof is well known in numerous and essentially unrelated technologies. In essence, such check valves which are utilized in connection with MEMS devices employing supercritical fluids are adapted to diverse potential uses, including being incorporated into micro pump systems and hydraulic circuit systems, wherein the combination of such systems and MEMS devices may provide micro refrigeration and heat exchanger structures.

In addition to the foregoing applications, the use of MEMS devices is adapted for integration thereof into processes for producing semiconductor chips and/or related electronic components. However, physical limitations which are evident through the introduction of fluids within the MEMS devices are caused by the surface tension of the fluid within the extremely small sized structures. Consequently, the use of supercritical high-pressure fluids which are combined with a check valve as a component of the overall structure and system enables the introduction of the fluid in order to fill the MEMS device and, then to be able to lock in the fluid at the required operating pressures. These devices become active when the working surface pressures and temperatures are elevated, causing a closed-loop pumping system, or a hydraulics and/or refrigeration loop to initiate operation.

Ordinarily, the loading or charging of MEMS devices with a supercritical fluid may be achieved through the intermediary of a processing cycle with a supercritical pressure vessel, and wherein the device is constructed with the incorporation of a suitable check valve which is initially in an open (through-flow) position at atmospheric pressure. Upon a pressure chamber of the device containing a workpiece which is to be treated being charged with a fluid to supercritical temperatures and pressures, that particular fluid will then be able to flow into the MEMS device due to an absence of surface tension in the fluid while in the supercritical phase. Thereafter, after a specified period of time, the chamber pressure is relieved, and the pressure drop will cause the fluid in the MEMS hydraulic system to attempt to escape, causing the check valve to close and thereby trapping the fluid in the structure. Thereafter, the check valve being at atmospheric pressure, will be permanently locked into the system.

For instance, the uses of cryogenic microcoolers employ a condenser, evaporator, flow restriction and counterflow heat exchangers have been described in article by Johannes Burger, et al., and titled "169 Kelvin Cryogenic Microcooler Employing a Condenser, Evaporator, Flow Restriction and Counterflow Heat Exchanges" in the 2001 IEEE, pages 418–421, presented at the $14^{th}$ IEEE International Conference of Micro Electro Mechanical Systems, Switzerland, Jan. 21–25, 2001.

SUMMARY OF THE INVENTION

Accordingly, in order to be able to accomplish the foregoing functioning in a simple and advantageous manner, through the incorporation of a novel check valve which is adapted to be incorporated into systems with MEMS devices operating with supercritical fluids, the present invention provides for the check valve being equipped with a bypass channel including a freely moveable plug structure which, in the open position of the valve enables the ingress of supercritical fluids under high superatmospheric pressures, and subsequent to the filling of the system, let down to atmospheric pressure, causes the plug to be moved into a permanent valve-closed position.

Pursuant to another embodiment of the invention, the check valve may incorporate a flexible valve element in the form of a flap member, which in the open position enables the flow from a narrow channel into a wider channel for loading the particular system with a supercritical fluid under a superatmospheric pressure, and subsequent to the filling of the system and let down thereof to atmospheric pressure, enables the flexible plug or flap member to provide a sealing element between the wide inner channel and a narrower outer channel to form a permanent closure for the MEMS device in which the check valve is installed.

BRIEF DESCRIPTION OF THE ACCOMPANYING DRAWINGS

Reference may now be made to the following detailed description of preferred embodiments of the inventive check valve for MEMS devices, taken in conjunction with the accompanying drawings; in which.

DETAILED DESCRIPTION OF PREFERRED EMBODIMENTS

Figure 1:
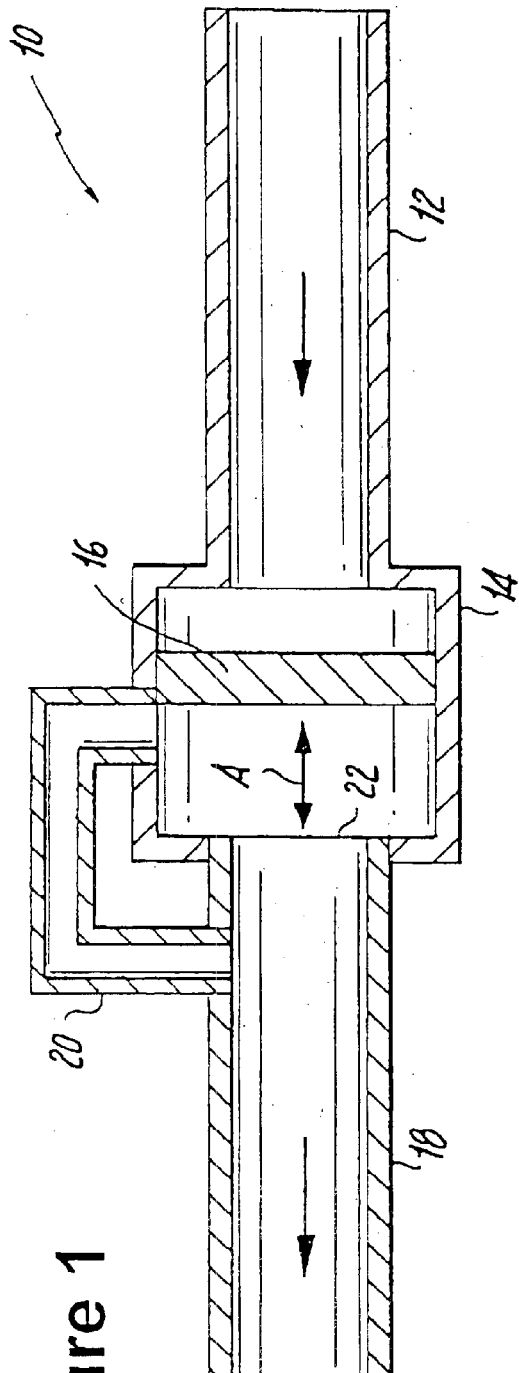
FIG. 1 illustrates, generally diagrammatically a longitudinal sectional view through a first embodiment of the check valve pursuant to the invention.
Figure 2:
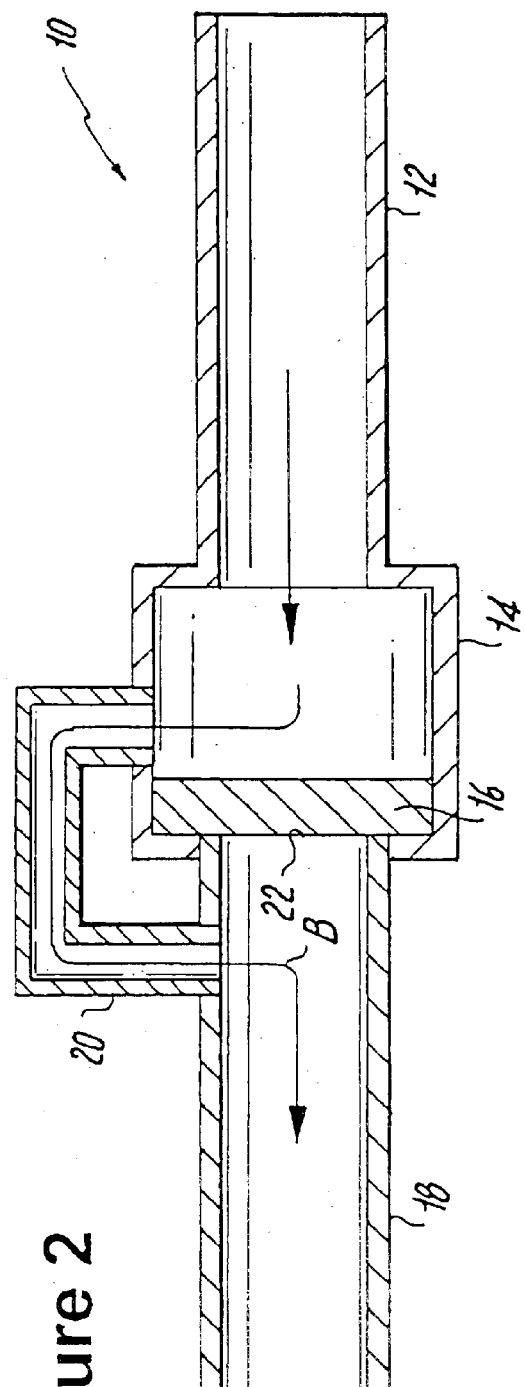
FIG. 2 illustrates the check valve of FIG. 1 in the open flow condition in connection with the filing of a MEMS device with a supercritical fluid.
Figure 3:
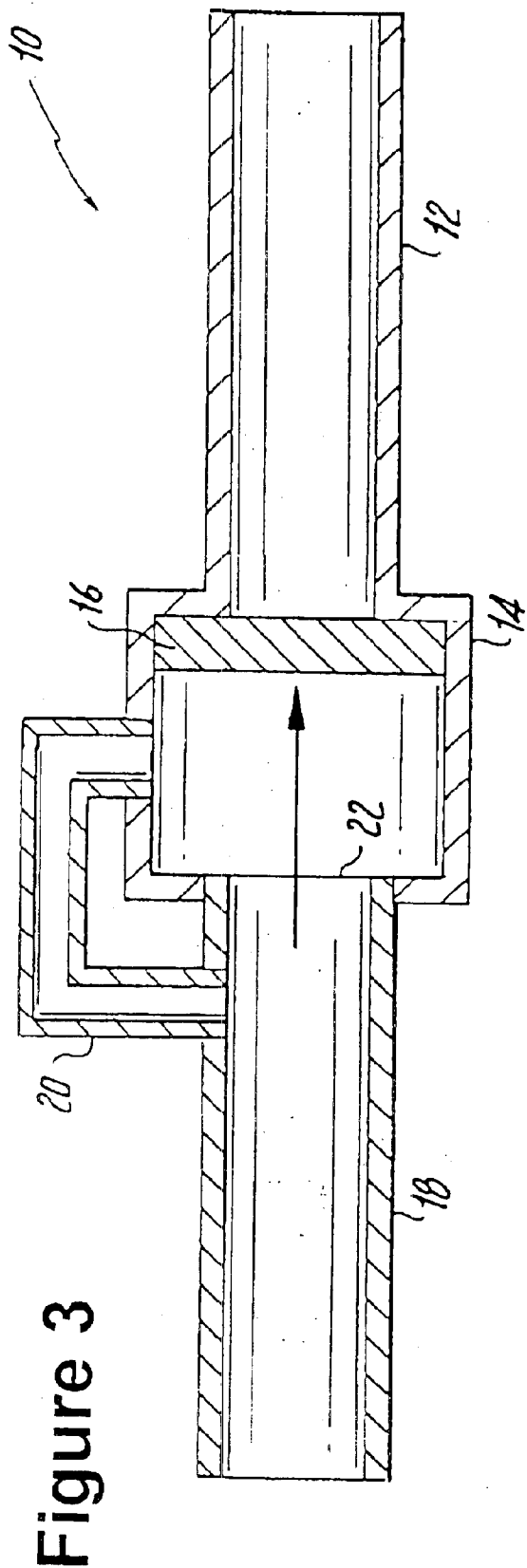
FIG. 3 illustrates the check valve in the closed condition subsequent to completing the filling and pressure let-down of the MEMS device.

Referring now in specific detail to the drawings, and particularly FIGS. 1 through 3, in FIG. 1 there is illustrated a check valve 10 which is adapted to be employed in connection with MEMS devices (not shown) utilizing supercritical fluids. The check valve 10, as illustrated in FIG. 1, provides for a first inlet conduit section 12 extending into an enlarged volumetric area or chamber 14 which contains a freely movable plug 16 which is adapted to move axially in the direction of double headed arrow A, depending upon the operating conditions of the check valve, as detailed hereinbelow.

The check valve 10 further includes, in an essentially coaxially relationship with the inlet conduit section 12, an outlet or discharge conduit section 18, whereby the chamber 14 containing the freely movable plug 16 and which is located intermediate conduit sections 12 and 18 in flow communication therewith, includes a bypass channel 20 extending in flow communication between the chamber 14 and the outlet conduit section 18.

Operation of the Check Valve

In implementing the filling of an MEMS system, such as charging the system with a supercritical fluid; for example, such as a cryogenic cooler or heater arrangement, or a workpiece treatment pressure vessel, the superatmospheric pressure of the fluid being conveyed into and through the check valve 10 causes the freely movable plug 16 to come into contact with the upstream wall 22 of the outlet duct 18, thereby causing the pressurized fluid to enter outlet duct 18 through the bypass channel 20, and to discharge in the direction of the arrow B shown in FIG. 2 into the MEMS device and the associated fluid system.

Upon the desired amount of supercritical fluid having been charged into the MEMS device, during which period of time the plug 16 is in the valve-open position due to the differential pressure, as shown in FIG. 2, the processing system is drawn-down to atmospheric pressure. This will cause the plug 16 of the check valve 10, as shown in FIG. 3 of the drawings, to assume a closed position against the downstream end 24 of the inlet conduit 12 maintaining fluid within the MEMS device, with the freely movable plug 14 shown forced by the lower pressure at the valve inlet end into the closed position against the discharge opening or end 24 of the inlet conduit section 12. This resultingly produces the permanent closure of the check valve 10 wherein the latter forms a component of the entire MEMS device and the fluid flow system operatively associated therewith.

Figure 4:
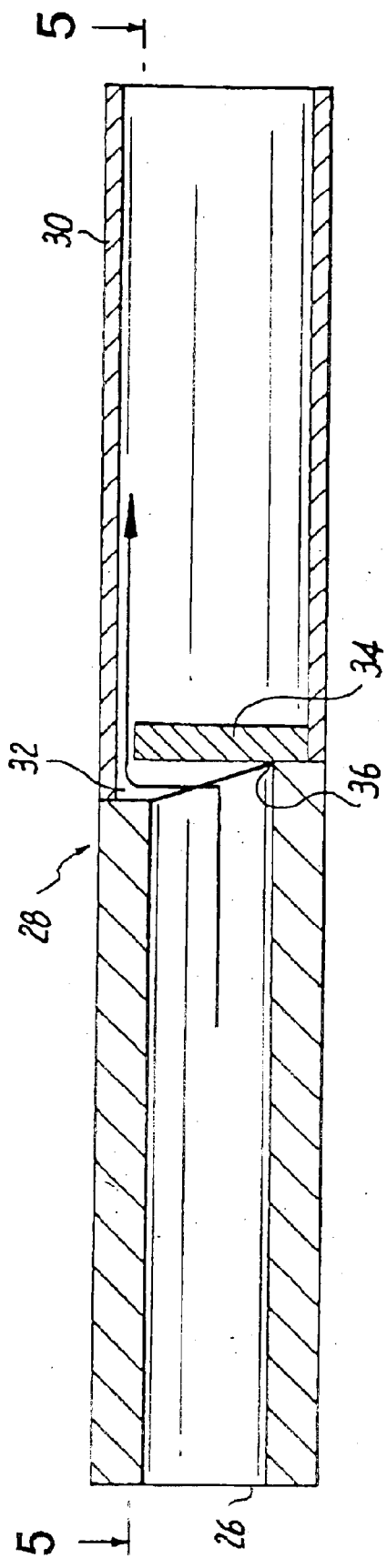
FIG. 4 illustrates, generally diagrammatically, a longitudinal sectional view through a second embodiment of the check valve pursuant to the invention.
Figure 5:
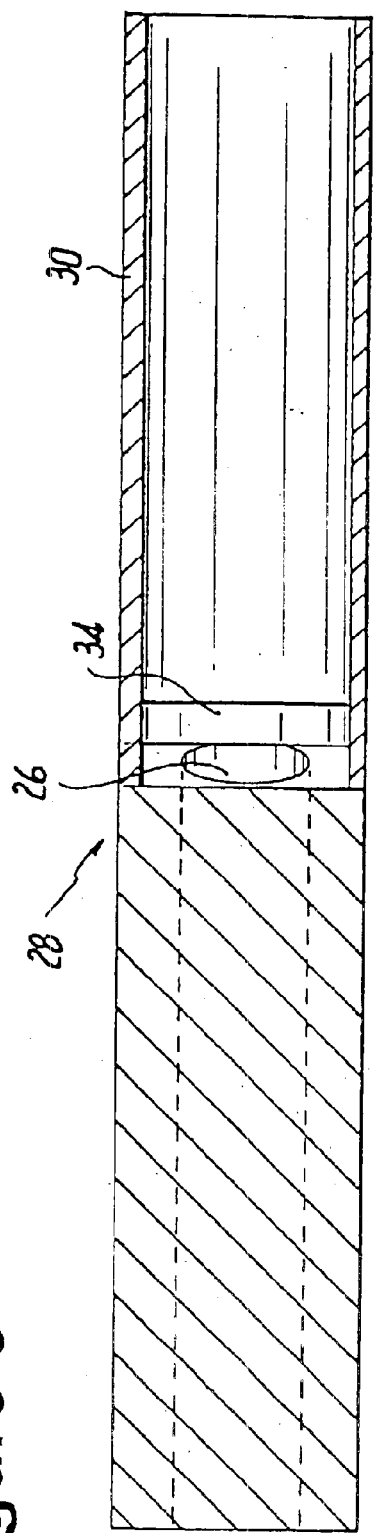
FIG. 5 illustrates a sectional view taken along line 5—5 in FIG. 4.
Figure 6:
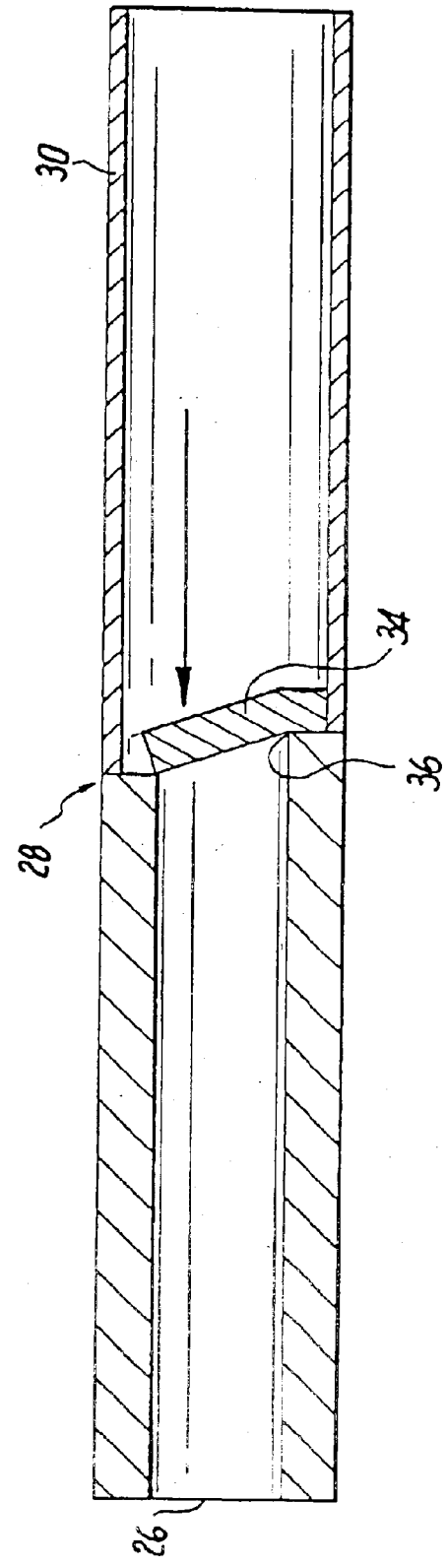
FIG. 6 illustrates the check valve of FIG. 4 in its closed condition.

Referring to the embodiment illustrated in FIGS. 4 through 6 of the drawings, in which an inlet conduit 26 of the check valve 28 is a narrow channel communicating with a wider discharge outlet channel 30 leading to the MEMS device through an aperture 32 past a flexible valve plate or plug 34. The operation of this check valve is essentially analogous to that described in connection with the check valve 10 of FIGS. 1 through 3, and wherein upon the let-down of the pressure in the processing system down to atmospheric pressure the flexible valve plate 34 will bend about a bending edge 36 so as to seal the wide channel 30 with respect to the narrow channel 26 by means of the pressure differential applied against the valve plate from the inlet side of the check valve. This causes the valve plate 34 to permanently close the check valve 28 and to become a constituent of the entire MEMS.

From the foregoing description of the check valve 10 or 28 this enables MEMS devices, such as micro refrigeration or heat exchangers, closed loop pumping system, closed loop hydraulic devices or supercritical fluid workpiece treatment vessels to be able to be employed for new applications, wherein the components for filling and maintaining supercritical fluid in the MEMS devices incorporate the inventive check valves for these purposes.

Moreover, the check valve and the MEMS device can also be used in connection with the processing and manufacture of semiconductor devices.

From the foregoing it becomes readily apparent that the check valve 10, 28 provides a novel and inexpensive structure which may be easily incorporated into the MEMS device systems in a highly advantageous and versatile manner.

While the invention has been particularly shown and described with respect to preferred embodiments thereof, it will be understood by those skilled in the art that the foregoing and other changes in form and details may be made therein without departing from the spirit and scope of the invention.

What is claimed is:

1. A check valve for micro electromechanical structure devices, said check valve being connectable to a supercritical fluid hydraulic system being rapidly charged with pressurized fluid under superatmospheric pressures and comprising:

a) a valve body having a fluid inlet conduit and a fluid outlet conduit;

b) a valve chamber of a larger internal diameter than said conduits being interposed between said fluid inlet and fluid outlet conduit in fluid flow communication with said fluid inlet and fluid outlet conduits, a valve seat being formed between said valve chamber and an adjoining end of said fluid input conduit;

c) a fluid bypass channel connecting said fluid outlet conduit and said valve chamber;

d) and a freely movable valve member being located in said valve chamber and having an external diameter in slidable contact with the internal diameter of said valve chamber, said valve member being axially displaced into a first valve-open position within said chamber facilitating an unobstructed flow by said pressurized fluid from said inlet conduit into said bypass channel through said valve chamber for charging said system, and responsive to a letdown of pressure upon said system having been charged, said valve member being axially displaced within said valve chamber into contact with said valve seat in a second valve-closing position so as to inhibit fluid flow through said check valve and seal said supercritical fluid hydraulic system.

2. A check valve as claimed in claim 1, wherein said valve is self-sealing responsive to said valve member being moved into contact with said valve seat.

3. A check valve as claimed in claim 1, wherein said valve comprises a permanent component of said system upon pressure letdown thereof in that said valve member is maintained in a sealing relationship with said valve seat.

4. A check valve as claimed in claim 1, wherein said valve member comprises a plug member which is slidable within said valve chamber between said first position in which said bypass channel enables fluid flow communication between said valve chamber and said fluid outlet conduit to facilitate filling said system and said second position in sealing engagement with said valve seat so as to inhibit fluid flow through said check valve.

5. A check valve as claimed in claim 1, wherein said hydraulic system is a component of a heating and cooling or pumping arrangement for supercritical fluids.

6. A check valve as claimed in claim 1, wherein said fluid bypass channel comprises a conduit of an internal diameter which is approximately the size of the internal diameters of each of said fluid inlet and outlet conduits.

* * * * *